(12) United States Patent
Prejer et al.

(10) Patent No.: US 9,753,493 B2
(45) Date of Patent: Sep. 5, 2017

(54) HOLDER FOR A TABLET COMPUTER

(71) Applicant: VÄDERSTAD-VERKEN AB, Väderstad (SE)

(72) Inventors: Gustav Prejer, Varberg (SE); Crister Stark, Väderstad (SE); Bengt-Arne Albrektsson, Linköping (SE); Stefan Välberg, Linköping (SE)

(73) Assignee: VÄDERSTAD-VERKEN AB, Väderstad (SE)

( * ) Notice: Subject to any disclaimer, the term of this patent is extended or adjusted under 35 U.S.C. 154(b) by 0 days.

(21) Appl. No.: 14/908,839

(22) PCT Filed: Jul. 22, 2014

(86) PCT No.: PCT/EP2014/065697
§ 371 (c)(1),
(2) Date: Jan. 29, 2016

(87) PCT Pub. No.: WO2015/014663
PCT Pub. Date: Feb. 5, 2015

(65) Prior Publication Data
US 2016/0161989 A1    Jun. 9, 2016

(30) Foreign Application Priority Data

Jul. 31, 2013 (SE) ..................... 1300520
Sep. 24, 2013 (SE) ..................... 1351101

(51) Int. Cl.
*G06F 1/16* (2006.01)
*B60R 11/02* (2006.01)
(Continued)

(52) U.S. Cl.
CPC ........ *G06F 1/1632* (2013.01); *B60R 11/0252* (2013.01); *F16M 13/02* (2013.01); *H02J 7/0042* (2013.01); *B60R 2011/0022* (2013.01)

(58) Field of Classification Search
CPC .... G06F 1/1626; G06F 1/1632; G06F 1/1671; G06F 3/0219
See application file for complete search history.

(56) References Cited

U.S. PATENT DOCUMENTS

| 4,007,443 | A | * | 2/1977 | Bromberg | ............. | G06F 3/0235 |
| | | | | | | 178/17.5 |
| D354,947 | S | * | 1/1995 | Peart | ........................ | D14/341 |

(Continued)

FOREIGN PATENT DOCUMENTS

EP    2 505 959 A1    10/2012

*Primary Examiner* — Adrian S Wilson
(74) *Attorney, Agent, or Firm* — Birch, Stewart, Kolasch & Birch, LLP

(57) ABSTRACT

The invention refers to a Holder having grip means for a detachable tablet computer or the like with a screen, said holder having a frame, which comprise holder means for reception of said tablet computer. The holder is provided for controlling a machine and comprises a hand grip side or hand grip side portion with buttons or sensors, which are provided for operating a machine by means of said tablet computer mounted thereon and which are able to be activated through finger touch/contact of said holder in order to communicate with certain functions of said tablet computer and/or of the machine which it is arranged to control. Said machine could be an agricultural implement, like a seed drill or the like.

8 Claims, 8 Drawing Sheets

(51) Int. Cl.
*F16M 13/02* (2006.01)
*H02J 7/00* (2006.01)
*B60R 11/00* (2006.01)

(56) References Cited

U.S. PATENT DOCUMENTS

| | | | | |
|---|---|---|---|---|
| 5,432,510 A * | 7/1995 | Matthews | ............ | H03K 17/967 341/20 |
| 5,515,305 A * | 5/1996 | Register | ............ | G06F 1/1626 400/486 |
| 5,764,180 A * | 6/1998 | Cummings | ............ | G08C 23/04 340/12.22 |
| D413,582 S * | 9/1999 | Tompkins | ............ | D14/344 |
| 6,028,765 A * | 2/2000 | Swindler | ............ | B60R 11/0252 174/138 G |
| 6,101,086 A * | 8/2000 | Kim | ............ | G06F 1/1616 108/43 |
| 6,107,988 A * | 8/2000 | Phillipps | ............ | G06F 1/1616 345/156 |
| 6,164,853 A * | 12/2000 | Foote | ............ | G06F 15/0225 400/472 |
| 6,297,752 B1 * | 10/2001 | Ni | ............ | G06F 1/1616 341/20 |
| D480,726 S * | 10/2003 | Yokota | ............ | D14/396 |
| 6,655,540 B2 * | 12/2003 | Shimoda | ............ | G06F 1/1626 16/428 |
| 6,671,170 B2 * | 12/2003 | Webb | ............ | G06F 1/1616 312/223.1 |
| 6,748,242 B1 * | 6/2004 | Dunleavy | ............ | H04M 1/0235 455/347 |
| 6,765,502 B2 * | 7/2004 | Boldy | ............ | G06F 3/0219 341/22 |
| 6,822,852 B2 * | 11/2004 | Von Novak | ............ | G06F 1/1626 345/169 |
| 6,885,314 B2 * | 4/2005 | Levin | ............ | G06F 3/0213 341/20 |
| 6,914,776 B2 * | 7/2005 | Kim | ............ | G06F 1/1616 345/168 |
| 6,947,028 B2 * | 9/2005 | Shkolnikov | ............ | G06F 1/1626 345/156 |
| 7,054,146 B2 * | 5/2006 | Sutton | ............ | G06F 1/1616 345/169 |
| 7,088,339 B2 * | 8/2006 | Gresham | ............ | G06F 3/0216 345/168 |
| 7,324,019 B2 * | 1/2008 | Levenson | ............ | G06F 3/0202 341/22 |
| 7,400,496 B2 * | 7/2008 | Sauer | ............ | G06F 1/1626 345/169 |
| 7,634,606 B2 * | 12/2009 | Kimchi | ............ | G01S 19/35 700/66 |
| 7,733,637 B1 * | 6/2010 | Lam | ............ | G06F 1/1626 361/679.08 |
| 7,881,055 B2 * | 2/2011 | Brandenberg | ............ | G06F 1/1613 361/679.01 |
| 7,969,732 B1 * | 6/2011 | Noble | ............ | F16M 11/041 248/917 |
| 8,014,148 B2 * | 9/2011 | Mori | ............ | G06F 1/1626 361/679.56 |
| D649,894 S * | 12/2011 | Daniels | ............ | D10/106.9 |
| 8,457,564 B2 * | 6/2013 | Champion | ............ | G06F 1/1624 341/22 |
| 8,611,086 B1 * | 12/2013 | Magnusson | ............ | G06F 1/1626 361/679.59 |
| 8,803,831 B1 * | 8/2014 | Priest-Dorman | ...... | G06F 1/1643 345/156 |
| 8,812,987 B2 * | 8/2014 | Joynes | ............ | G06F 3/04817 345/666 |
| 8,972,617 B2 * | 3/2015 | Hirschman | ............ | G06F 3/0219 463/37 |
| 9,310,905 B2 * | 4/2016 | Luo | ............ | G06F 3/041 |
| 2001/0045938 A1 | 11/2001 | Willner et al. | | |
| 2002/0024794 A1 * | 2/2002 | Lin | ............ | G06F 1/1632 361/679.43 |
| 2002/0044406 A1 * | 4/2002 | Shimoda | ............ | G06F 1/1626 361/679.02 |
| 2002/0069364 A1 * | 6/2002 | Dosch | ............ | G06F 1/1626 726/26 |
| 2002/0118175 A1 * | 8/2002 | Liebenow | ............ | G06F 1/1626 345/168 |
| 2002/0147035 A1 * | 10/2002 | Su | ............ | H04B 1/3877 455/572 |
| 2003/0184958 A1 * | 10/2003 | Kao | ............ | G06F 1/1626 361/679.26 |
| 2004/0025993 A1 * | 2/2004 | Russell | ............ | F16M 11/00 150/154 |
| 2004/0226973 A1 * | 11/2004 | Kao | ............ | F16M 11/041 224/218 |
| 2007/0113098 A1 * | 5/2007 | Croley | ............ | G06F 1/1626 713/186 |
| 2007/0152633 A1 * | 7/2007 | Lee | ............ | G06F 1/1632 320/114 |
| 2007/0247793 A1 * | 10/2007 | Carnevali | ............ | G06F 1/1626 361/679.1 |
| 2007/0268261 A1 * | 11/2007 | Lipson | ............ | G06F 1/1616 345/169 |
| 2009/0219684 A1 * | 9/2009 | Mori | ............ | G06F 1/1626 361/679.56 |
| 2009/0291760 A1 * | 11/2009 | Hepburn | ............ | A63F 13/02 463/37 |
| 2010/0081505 A1 * | 4/2010 | Alten | ............ | A63F 13/95 463/36 |
| 2010/0141586 A1 * | 6/2010 | Schneider | ............ | G06F 3/0202 345/168 |
| 2011/0188176 A1 * | 8/2011 | Kim | ............ | H05K 7/00 361/679.01 |
| 2011/0240448 A1 * | 10/2011 | Springer | ............ | F16M 11/041 200/331 |
| 2011/0279959 A1 * | 11/2011 | Lopez | ............ | A45F 5/00 361/679.03 |
| 2012/0019016 A1 * | 1/2012 | Brisbin | ............ | A45F 5/00 294/137 |
| 2012/0039021 A1 * | 2/2012 | Karwan | ............ | G06F 1/1632 361/679.01 |
| 2012/0068832 A1 * | 3/2012 | Feldstein | ............ | F16M 11/041 340/12.5 |
| 2012/0113034 A1 | 5/2012 | McDermid | | |
| 2012/0170211 A1 * | 7/2012 | Waller | ............ | A45F 5/102 361/679.56 |
| 2012/0206867 A1 | 8/2012 | Pence | | |
| 2013/0005401 A1 | 1/2013 | Rosenhan et al. | | |
| 2013/0058659 A1 | 3/2013 | Umezu et al. | | |
| 2013/0159928 A1 * | 6/2013 | Joynes | ............ | G06F 3/04817 715/810 |

* cited by examiner

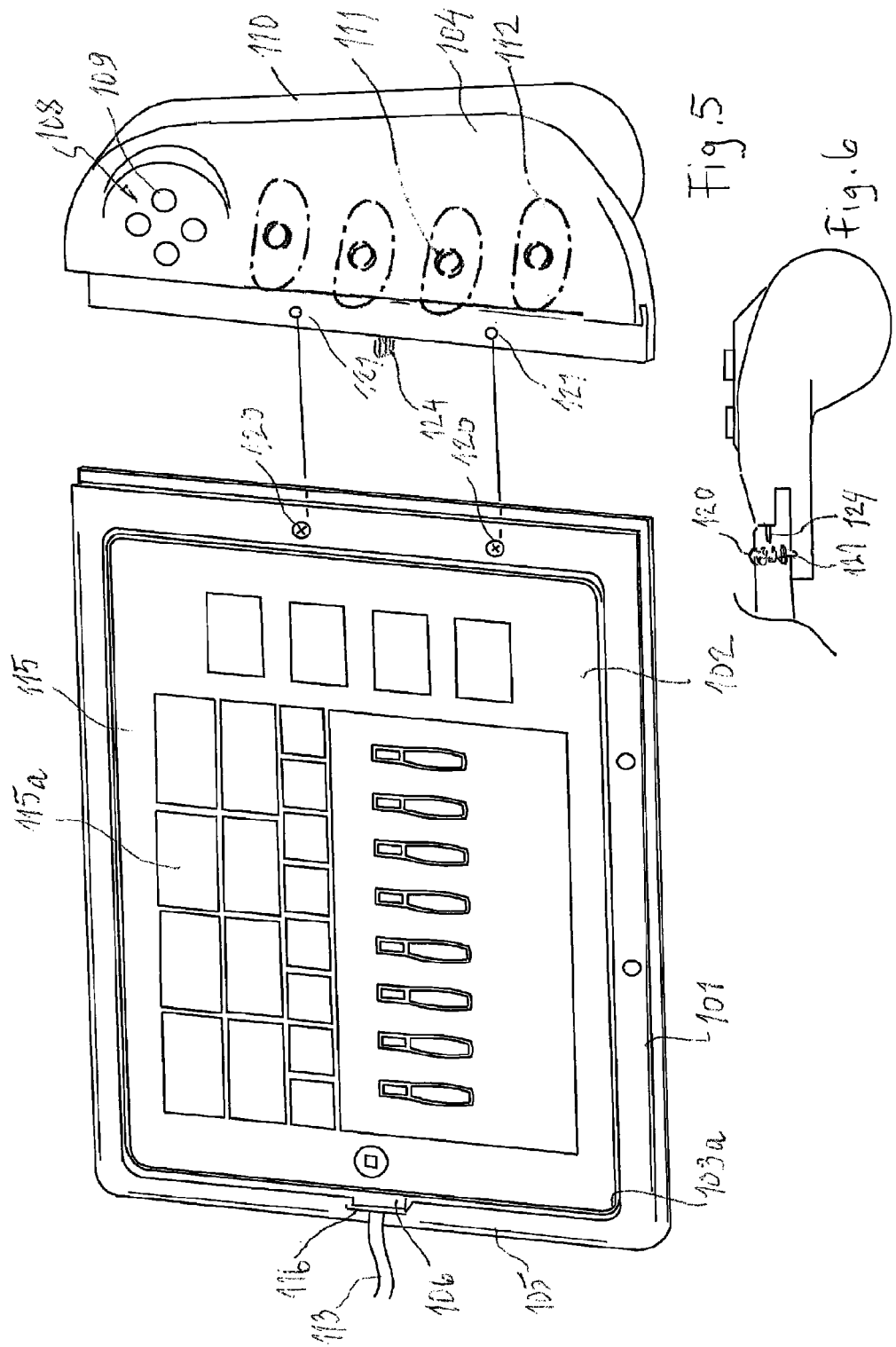

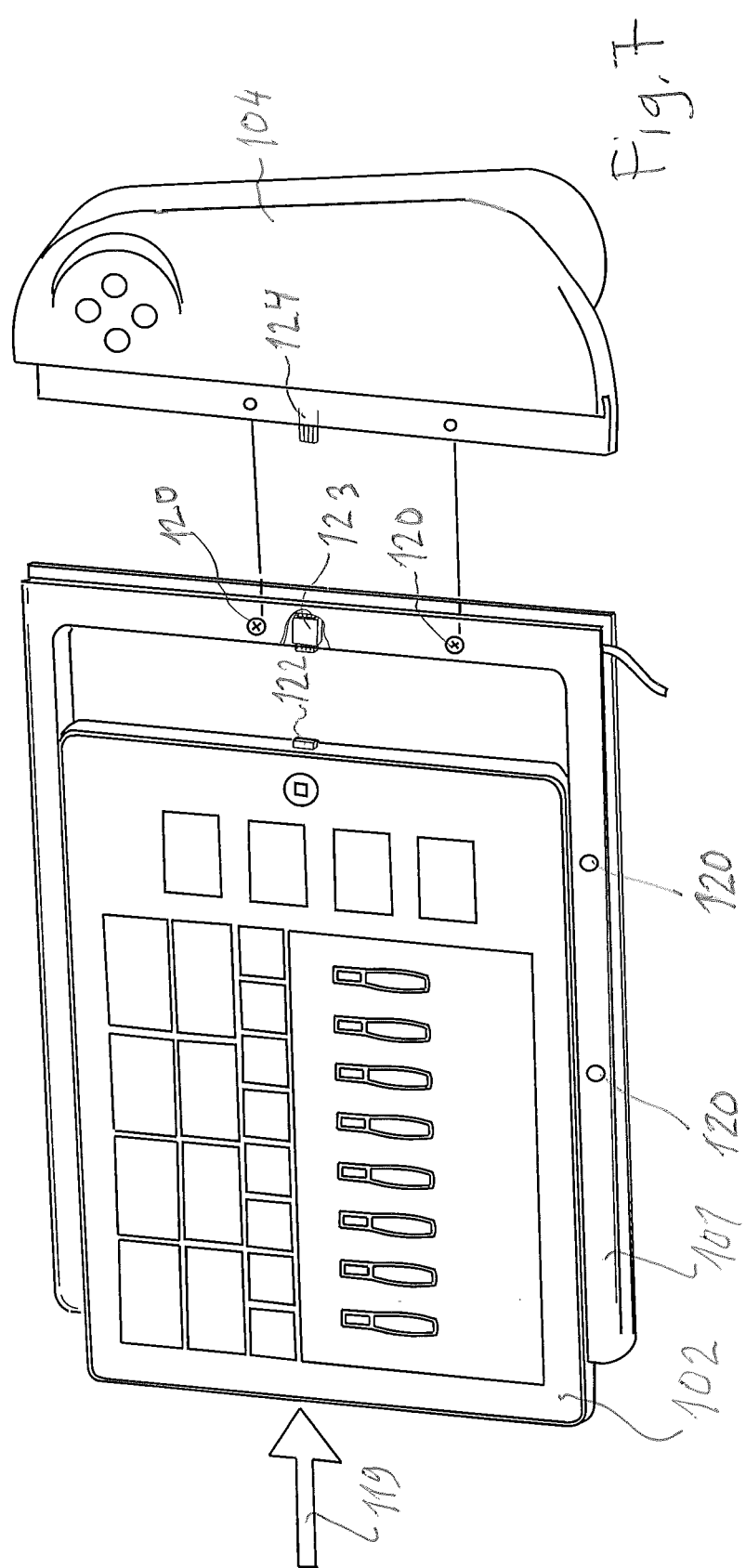

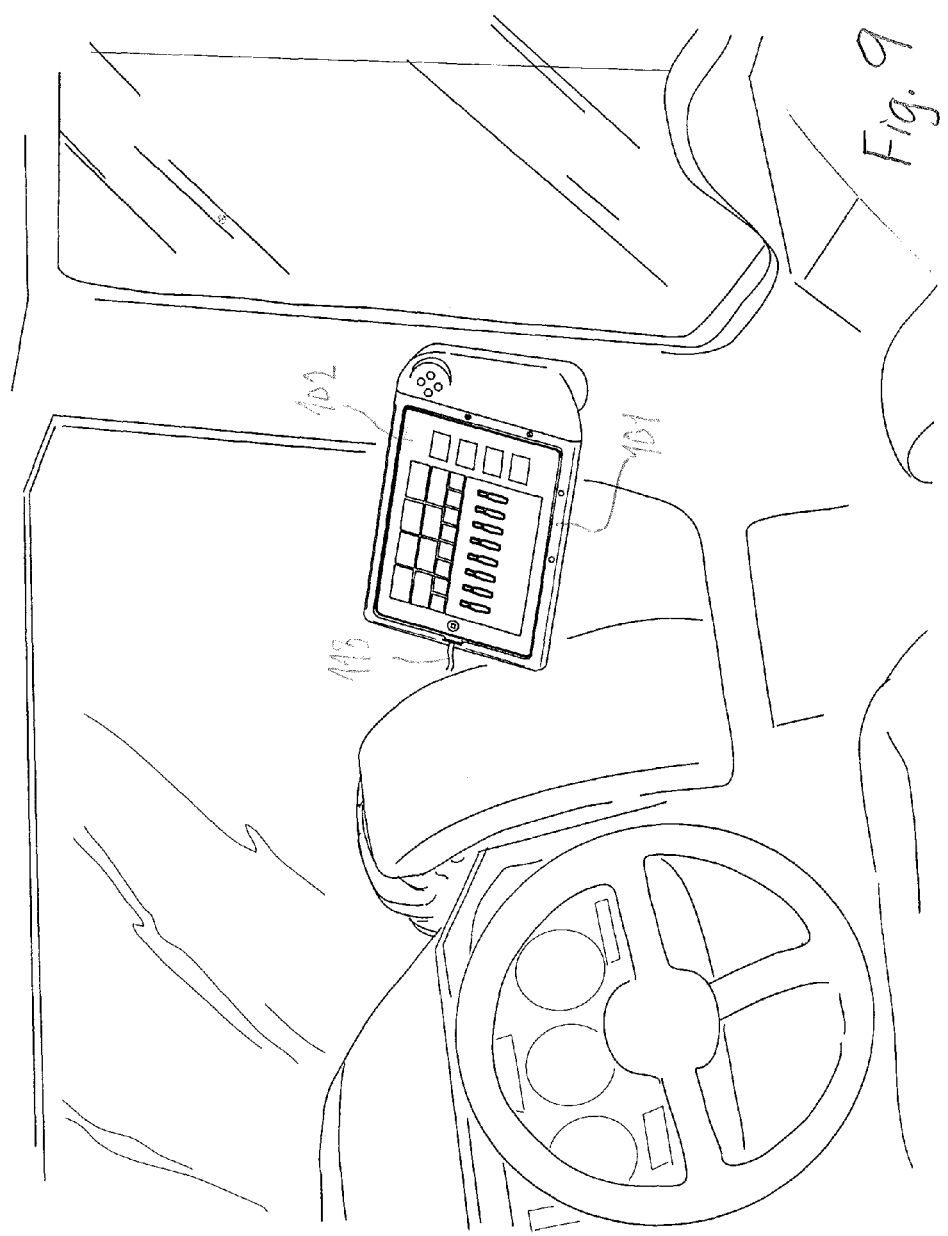

HOLDER FOR A TABLET COMPUTER

TECHNICAL AREA

The present invention relates to a holder for a detachable tablet computer or similar according to the pre-characterising portion of Claim 1.

BACKGROUND TO THE INVENTION

In pace with technological development in agriculture and other technical areas, the electronics in agricultural machines and other machines have acquired an increasingly central role. Electrical/electronic systems were initially simple on agricultural machines, such as seed drills. Gradually, systems have been developed both by individual manufacturers and as standardised protocols, for example ISO Bus. In pace with the general trends in electronics and the development of specific software for agricultural and financial management, increasingly high demands are being placed on electronics for the control, monitoring and manoeuvring of e.g. seed drills. It also lies within the nature of the issue to integrate the electronics found on agricultural machines with the systems available for overall farm and business management.

It has according to the development in this area been produced holders for tablet computer or similar. Hence, different kinds of holders for a detachable tablet computer or similar are known from e.g. US 2012/0075789, US 2013/0120258 and US 2001/0045938. These devices are merely used to hold and control the tablet as a sort of keyboard facilitating the use of the tablet mounted thereon. US 2012/0206867 describes a device for mounting a holder with a tablet mounted thereon and a stowing device for tablets.

In recent decades we have seen very strong development and use of GPS systems, for example for logging the position of an agricultural machine, which logging can occur in rapid sequence, for example after every second. In such logging a range of parameters other than the geographical position can also be logged. These can include the working depth of the machine, the draught employed, the characteristics of the soil, the amount of seed or fertiliser metered out, the meteorological conditions or some other feature/parameter that one wishes to document and relate to geographical positions. Similar development can be seen in other machines such as aeroplanes, contracting equipment etc.

In recent years we have seen dramatic development of mobile electronics such as smart phones, mobile internet devices or tablet computers. These can for example be in the form of tablet computers sold under the sales name iPad or iPhone. Tablet computers open up new opportunities for an even higher degree of development of electronic aids for agriculture machines and other mobile equipment and vehicles.

An increasingly large number of functions need to be controlled on a modern machine. A seed drill is used here as an example of a machine, but this technique can also be applied to other types of machines, for example planters (precision seed drills) and machines that are used outside agriculture.

It can involve controlling the amount of fertiliser, seed or pesticide metered out. It can involve lifting, lowering the entire machine or adjusting different tools or applying the seed coulters with different pressures on different parts on the field. It can involve converting a measured value to a desired value, for example as regards drilling depth, working depth or other. For contracting equipment similar conditions also apply.

An increasing amount of data is desired to be collected for different reasons, some reasons relating to crop production technology, others to statutory requirements. For example, certain tasks may only be carried out in particular wind conditions. It can then be relevant to log and document wind speed, temperature, time etc. in a certain task. Maps have acquired central importance in modern agriculture and in contracting work it is often relevant to create maps during different operations such as drilling, excavation. It can be relevant to place out (sow) different amounts of fertiliser, seed or chemicals. This may need to be documented in real time or on one or more maps.

One requirement may be to order replacement parts directly from the field as a result of wear or breakdown.

The list can be made even longer with desirable functions that the farmer or contractor can have. It is then natural to consider the use of new technology for example in the form of a tablet computer sold under the sales name iPad or iPhone or any other known smartphone. These 'devices' have enormous potential for solving the abovementioned functions. They are not only computers, but can also communicate through GSM, WiFi and Bluetooth. However, they have a major disadvantage with touch screens in the environment in which they have to work. These are difficult to operate with the required precision in a shaky environment. They can also be too fragile for the environment in which they should work.

OBJECT OF THE INVENTION

The object of the present invention is to provide a holder for a mobile internet device/tablet computer or similar of the initially described type that solves the above mentioned problems.

This object is achieved with a holder for a mobile internet device/tablet computer or similar, which holder has been given the characterising features specified in claim 1.

Preferred embodiments of the holder have been given the characterising features specified in the sub-claims.

SUMMARY OF THE INVENTION

All the above-mentioned requirements can be combined in a holder for a mobile internet device, such as a tablet computer or similar, where the holder has special functions. In the following, a mobile internet device, a tablet computer, a smartphone or similar is referred to by the collective term "tablet computer". According to the invention a holder for a tablet computer is thus provided which can be used to control a machine. Through the holder according to the invention, the tablet computer can be mounted in an ideal way in a tractor cab or machine cab, cockpit or similar. It can be fastened up there and can be seen and used in a good way. The holder is so designed, that it makes the tablet computer easily insertable and removable and it should also provide a suitable protection of the tablet computer. The holder is preferably fitted with a shading screen that shades the tablet computer's screen during work, especially in sunny conditions. The holder can also be built-in so that it does not require any other connection than a power supply. The communication can also be conducted wirelessly.

The holder according to the invention is suitably made in such a way that a number of buttons are adapted for manoeuvring the machine by means of the tablet mounted thereon, at least to the extent that all commonly occurring operations can be carried out without the need to use the touchscreen. The concept of the invention includes providing the holder with an ergonomic handle on one of its sides. This handle is suitably designed with finger grip positions. In these positions, buttons/sensors or similar can be accessible. Each 'button' activates a function in the machine. The word "button" is here the collective term for all kind of buttons like press-button keys, touch buttons or the like. When this function is activated commands can be issued with the buttons on the upper side of the console, which are suitably used with the thumb—in one embodiment of the invention directly on the touchscreen. The driver then has a steady handle which is easy to grip while driving and also has a good and ergonomic contact with the buttons on the underside of the console, so it is easy to reliably select the function he wishes to use. An additional improved function is obtained in that each button is given a matching icon on the screen of the tablet computer. When a button on the holder and thus a function is activated, the corresponding icon lights up on the tablet computer screen from having been half-illuminated. The driver then obtains visual confirmation that he has activated the desired function. This facilitates the work further and makes the machine operations even more secure.

Another advantage is that the driver can take the tablet computer out of the tractor cab or driving seat and from outside the tractor cab or driving seat carry out certain manoeuvres that are permitted from a safety perspective.

Technically, the buttons on the holder can communicate with the tablet computer via a cable that supplies power to the buttons, their electronics and the tablet computer. It is also possible that the communication is provided wireless by means of for example Bluetooth.

A further development of the device according to the invention is the use to control an agriculture agricultural implement, like a seed drill or the like.

DRAWINGS SUMMARY

The invention is described in more detail in the following with reference to the attached drawings which show preferred embodiments.

FIG. 5 shows a perspective view from the front of a second embodiment of a holder in a detached condition.

FIG. 6 shows a detail view from the side of the holder of FIG. 5.

FIG. 7 shows a view similar to FIG. 5 of the holder of FIG. 5 in another detached condition.

FIG. 9 shows a perspective view inside a vehicle with the holder of FIG. 5 having a tablet computer, said holder being mounted on an arm.

DESCRIPTION OF PREFERRED EMBODIMENTS

Figure 1:
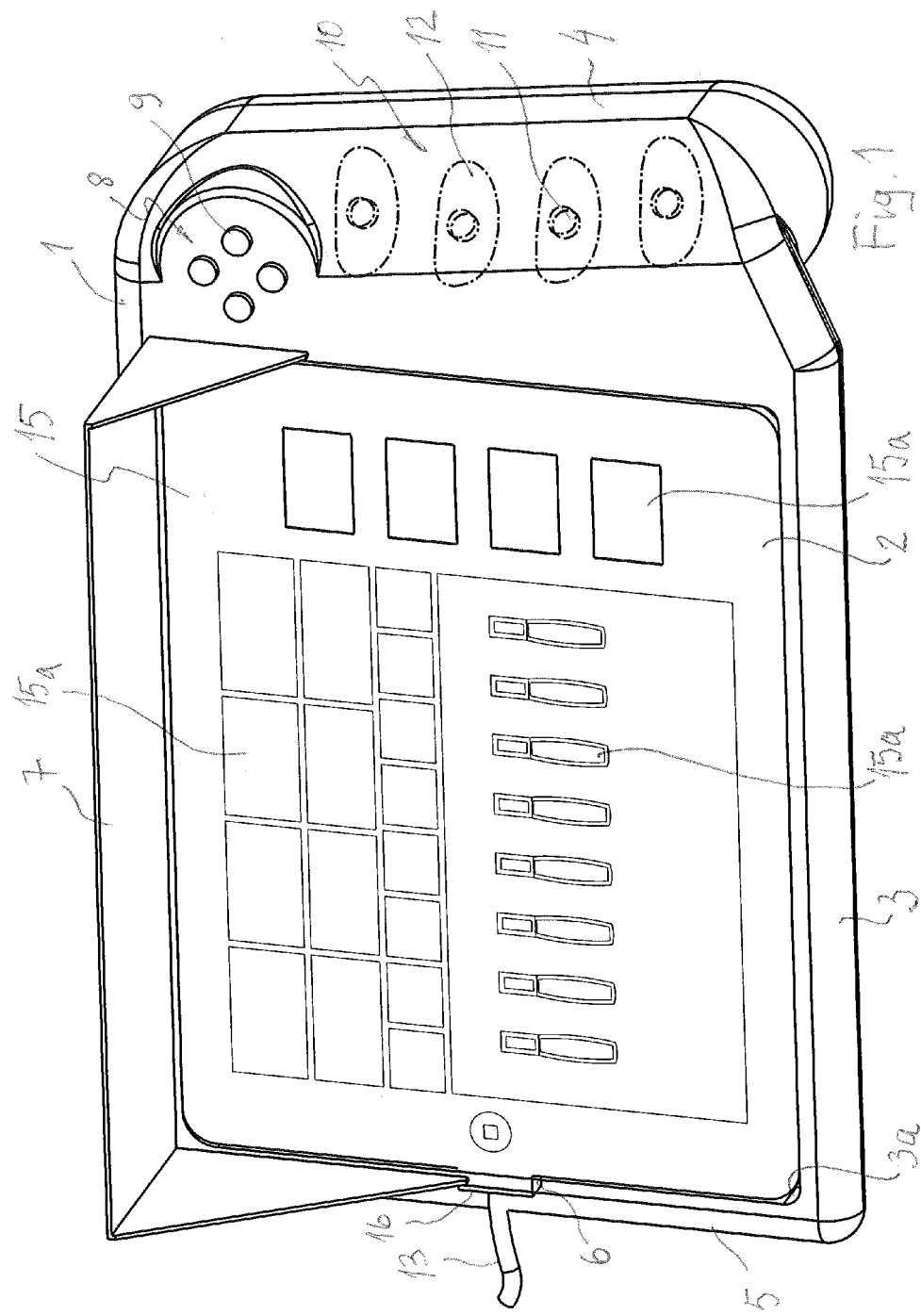
FIG. 1 shows a perspective view from the front of a first embodiment of a holder according to the invention with a tablet computer inserted.

FIGS. 1-4 illustrate a first embodiment of a holder 1 according to the invention for a tablet computer 2 or similar. The holder 1 comprises a frame 3 with a hand grip side 4 (on the right in FIG. 1). On the opposite side 5 of the frame 3 (on the left in FIG. 1) there are connections 6 for charging, lighting etc. The holder 1 is provided with a socket 3a arranged in the frame 3, said socket 3a having a mainly rectangular shape for a suitable tablet computer 2 or similar. A sun screen 7 is arranged along the upper part of the holder 1 for clearer readability of the tablet computer 2, for example in direct sunlight. On the front side of the holder 1 there is a first set 8 of manoeuvre buttons 9 for manoeuvring, preferably with the thumb of the right hand. In the example shown there are four buttons 9 or sensors for manoeuvring of for example the functions up, down, right and left. On the rear side of the holder 1 there is a second set 10 of manoeuvre buttons 11 adapted for the other fingers of the right hand with preferably up to four buttons 11 or touch sensors. Each button 11 in the second set 10 of manoeuvre buttons can, as shown in the drawings, be arranged in a recess 12 for more secure access to the proper button 11.

Figure 2:
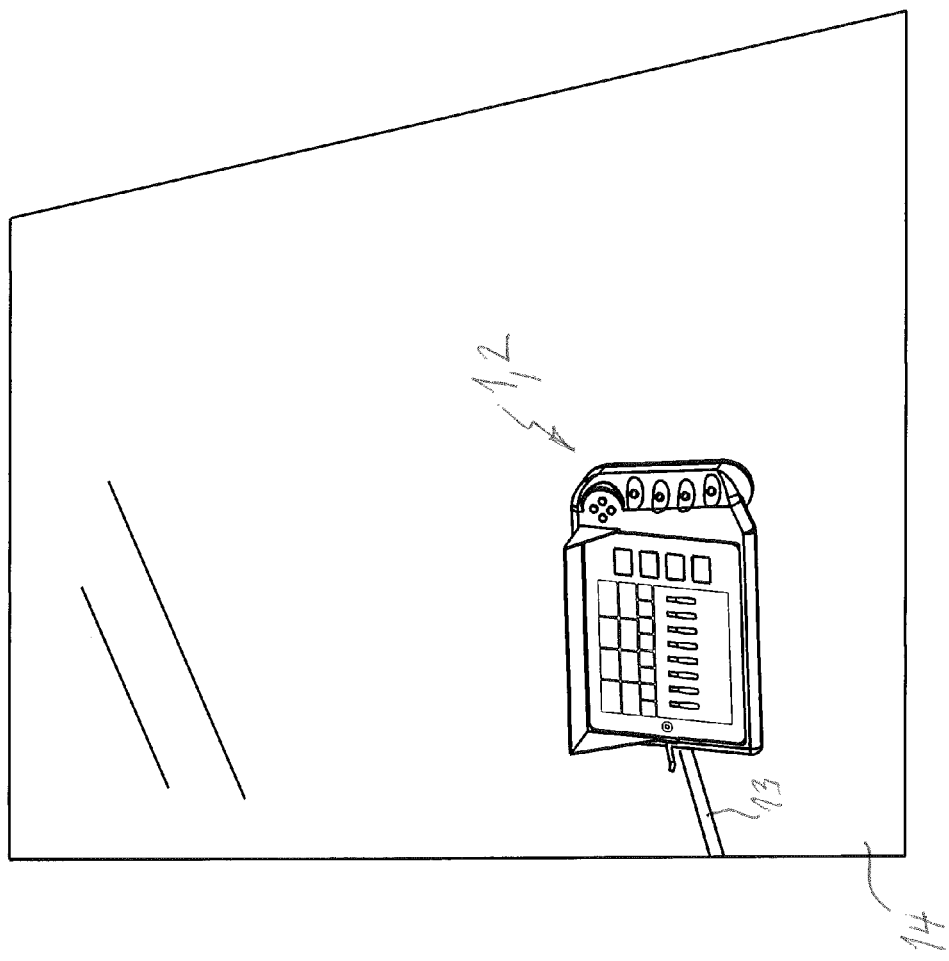
FIG. 2 shows a perspective view through the window of a vehicle with the holder of FIG. 1 having a tablet computer, said holder being mounted on an arm.

FIG. 2 shows how a holder 1 with a tablet computer 2 inserted can be arranged on an arm outside an openable window of a vehicle, preferably a towing vehicle such as a tractor, whereby the holder and computer tablet are used to control certain functions of a towed machine, such as a towed agriculture implement, like a seed drill or the like.

The first set 8 of manoeuvre buttons 9 could also be arranged on the lower end of the right side for a left-handed person. In that case connections corresponding to the connections 6 could be duplicated or left in place, since the screen 15 of the tablet computer 2 with automatics can be turned when the tablet computer is turned. Alternatively, connections, such as the connections 6, can also be arranged on both sides of the holder 1. The user would in that case turn the holder 1. At such an arrangement the sun screen 7 would be detachable to be able to move it to the opposite side of the holder 1.

Icons and areas 15a on the screen 15 of the tablet computer 2 refer to functions of the machine. The graphical interface of the tablet computer 2 can be provided with icons or areas 15a that match the buttons 9, 11 and are adapted to alter character, for example light up, when a button 9, 11 is activated. One of the buttons 9, 11 or additional a not shown button can be adapted to activate the tablet computer 2 so that it can be operated through the holder 1, i.e. a so-called 'dead man's grip'. The buttons 9, 11 can be activated in two steps, i.e. first a function is selected, such as a button 11 on the underside of the holder 1, and then a function is manoeuvred, such as left, right, up, down etc. with a button 9 on the upper side of the holder, or the other way round.

One of the buttons 11 on the underside can activate an icon 15a, which can be pushed or touched to control preselected functions of the machine, whereby one icon 15a on the screen 15 can be used and other icons 15a remain inactive, wherein the icons 15a on the screen 15 of the tablet computer 2 can replace the buttons 9 on the front side, i.e. the buttons 9 activated with the thumb. Furthermore, the buttons 9, 11 and their electronics can be built into the holder 1. The buttons 9, 11 on the holder 1 can alternatively be adapted to communicate wirelessly with the tablet computer 2. The holder 1 can be provided with a socket 16 for a charging cable 13 for the tablet computer 2 and/or the holder 1, wherein when the charging cable 13 is removed only certain functions of the holder 1 are possible to activate. This could be a way to limit the functions when the driver takes the tablet computer 2 outside the cab of the vehicle. When the charging cable 13 is removed from the tablet computer 2 or when the tablet computer 2 is removed from the holder 1, only certain functions of the tablet computer 2 can be allowed/be activated, i.e. certain functions of the machine can be blocked and no longer be controlled by the tablet computer. It is also provided that certain functions can still be activated on the holder 1 when the tablet computer 2 is removed therefrom.

Figure 3:
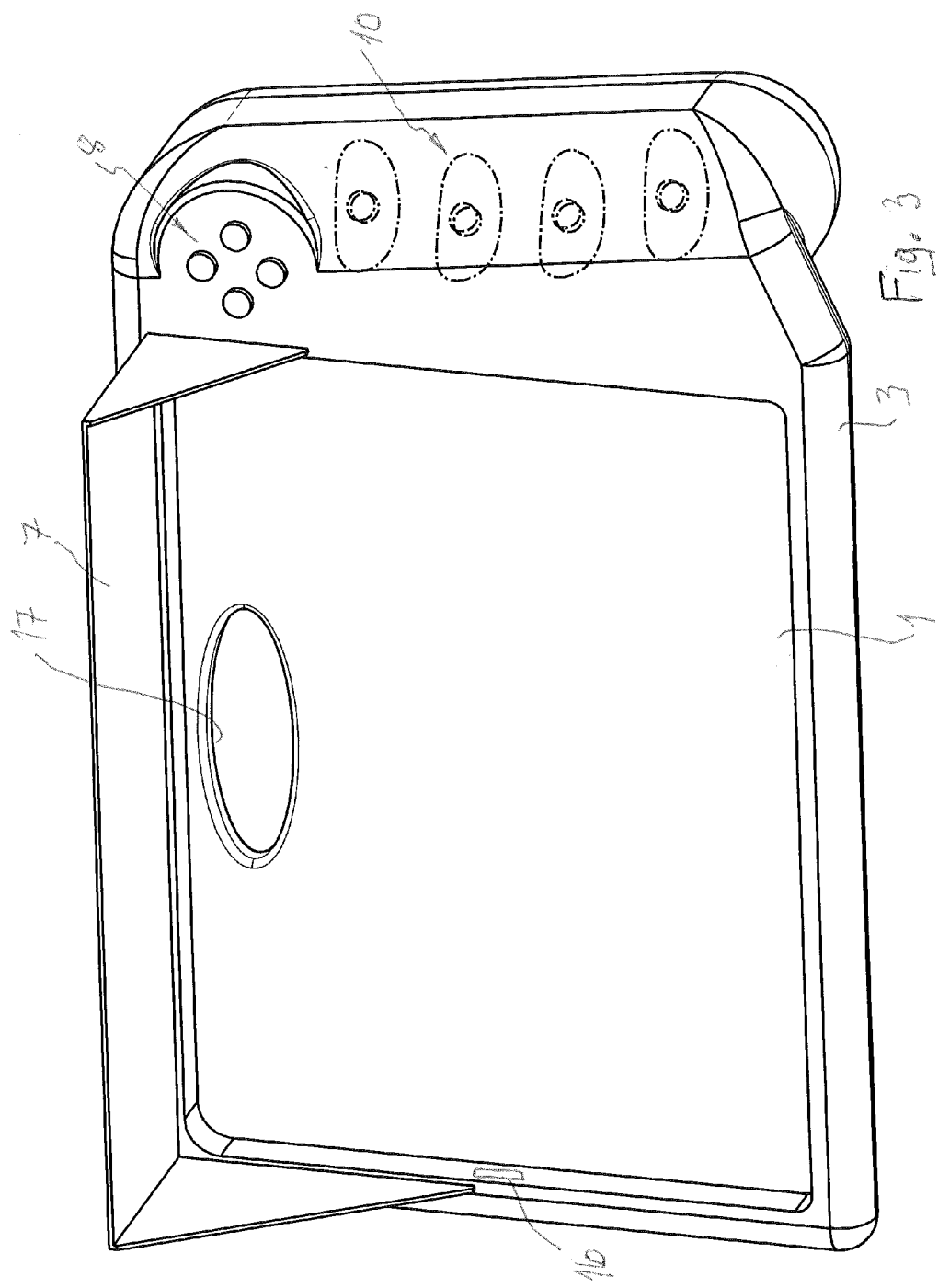
FIG. 3 shows a perspective view from the front of the holder of FIG. 1 according to the invention without a tablet computer inserted.
Figure 4:
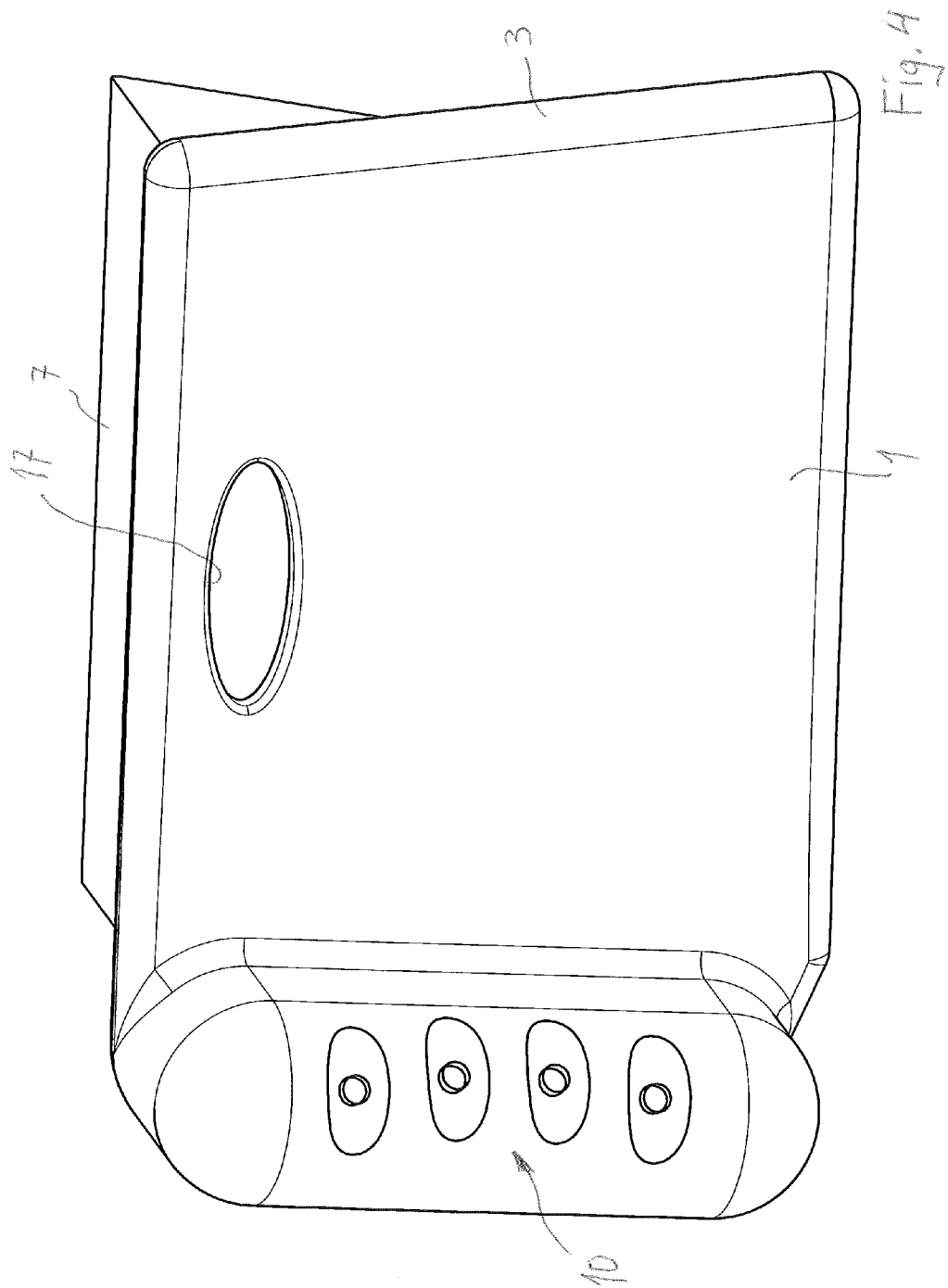
FIG. 4 shows a perspective view from the rear of the holder of FIG. 1 without a tablet computer inserted.
Figure 8B:
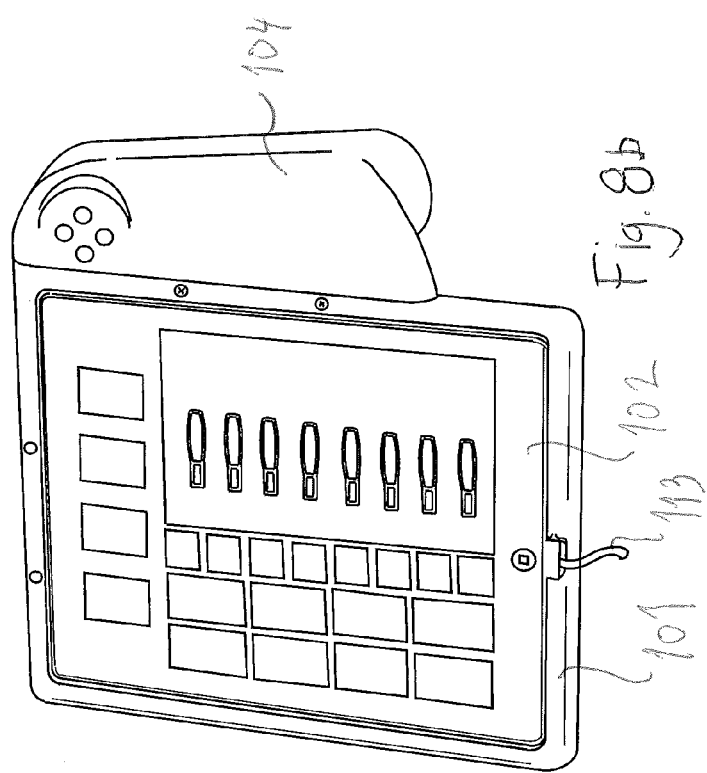
FIGS. 8a and 8b show perspective views from the front of two possibilities to attach a detachable key set portion on the holder of FIG. 5.
Figure 8A:
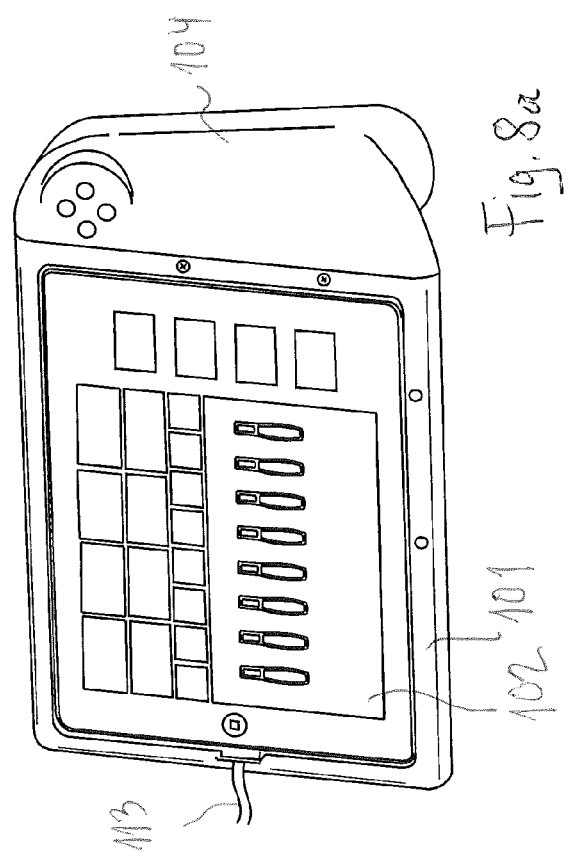

As is illustrated in FIGS. 3 and 4 a recess 17 is arranged to facilitate removing the tablet computer 2 from the holder. Furthermore additional recesses can be arranged for camera lenses and loudspeakers on the tablet computer 2.

FIGS. 5-9 illustrate a second embodiment of a holder 101 according to the invention for a tablet computer 102 or similar. The holder 101 comprises a frame 103 with a detachable hand grip side portion 104 (on the right in FIG. 5). On the opposite side 105 of the frame 103 (on the left in FIG. 5) there are connections 106 for charging, lighting etc. The holder 101 is provided with a socket 103a arranged in the frame 103 with a mainly rectangular shape for a suitable tablet computer 102 or similar. The detachable hand grip side portion 104 of the holder 101 consists of an integral key set portion. On the front side of the hand grip side portion 104 of the holder 101 there is a first set 108 of manoeuvre buttons 109 for manoeuvring, preferably with the thumb of the right hand. In the example shown there are four buttons 109 or sensors for manoeuvring of the functions up, down, right and left. On the rear side of the hand grip side portion 104 of the holder 101 there is a second set 110 of manoeuvre buttons 111 adapted for the other fingers of the right hand with preferably up to four buttons 111 or touch sensors. Each button 111 in the second set 110 of manoeuvre buttons can, as shown in the drawings, be arranged in a recess 112 for more secure access to the buttons 111.

FIG. 9 shows how a holder 101 with a tablet computer 102 inserted can be arranged on an arm inside a vehicle, preferably a towing vehicle such as a tractor, whereby the holder and computer tablet are used to control certain functions of a towed machine, such as a towed agriculture implement, like a seed drill or the like.

Icons and areas 115a on the screen 115 of the tablet computer 102 refer to functions of the machine. The graphical interface of the tablet computer 102 can be provided with icons or areas 115a that match the buttons 109, 111 and are adapted to alter character, for example light up, when a button 109, 111 is activated. One of the buttons 109, 111 or additional a not shown button can be adapted to activate the tablet computer 102 so that it can be operated through the holder, i.e. a so-called 'dead man's grip'. The buttons 109, 111 can be activated in two steps, i.e. first a function is selected, such as a button 111 on the underside of the holder 101, and then a function is manoeuvred, such as left, right, up, down etc. with a button 109 on the upper side of the holder, or the other way round.

One of the buttons 111 on the underside can activate an icon 115a, which can be pushed upwards/downwards or alternatively to the right/left, whereby one icon 115a on the screen 115 can be used and other icons 115a remain inactive, wherein the icons 115a on the screen 115 of the tablet computer 102 can replace the buttons 109 on the front side, i.e. the buttons 109 activated with the thumb. Furthermore, the buttons 109, 111 and their electronics can be built into the holder 101. The buttons 109, 111 on the holder 101 can alternatively be adapted to communicate wirelessly with the tablet computer 102. The holder 101 can be provided with a socket 116 for a charging cable 113 for the tablet computer 102 and/or the holder 101, wherein when the charging cable 113 is removed only certain functions in the holder 101 are possible to activate. This could be a way to limit the functions when the driver takes the tablet computer 102 outside the cab of the vehicle. Only certain functions of the tablet computer 102 can be allowed/be activated, i.e. certain functions can be blocked when the charging cable 113 is removed from the tablet computer 102.

As shown in FIGS. 5-9 the holder 101 according to the invention of the second embodiment differs from the holder 1 of the first embodiment in that the hand grip side 104 with the key set portion is detachable and can be mounted either on the short side of the holder 101 or on the long side thereof. The reference number 120 denotes snap buttons which are entered in holes 121 to lock the hand grip side portion 104 to the rest of the holder 101. The release of the hand grip side portion 104 from the holder 101 can be such that it is simply drawn out of the snap engagement consisting of the buttons 120 and the holes 121, see especially FIG. 6. In FIG. 5 the tablet computer 102 is placed in the holder 101 with its charging cable 113 in contact on the input side of the holder 101. The charging cable 113 is connected to the tablet computer 102 on the input side of the holder 101.

In FIG. 7 the tablet computer 102 is introduced into by pushing it according to an arrow 119 into the holder from one side of the holder 101. The charging cable contact 122 is on the opposite side compared with the application of FIG. 5 where the tablet computer is snapped into the socket 3a of the frame 3. A charging cable contact 122 of the tablet computer 102 is to be connected to a contact 123 on the holder 101. The contact 123 will then be connected to the contact 124 on the hand grip side portion 104. A contact similar to the contact 123 will be mounted at the long side of the holder 101 for energy supply to the key set portion 101a when it is detachably mounted on the long side of the holder 101 for use when the user intends to engage hand grip side portion 104 on the long side of the holder 101. The positioning of hand grip side portion 104 on the long side or the short side of the holder 101 depends on the space need inside the tractor cabin or on the user's desire. Apart from how the tablet computer 102 is oriented in the holder 101, it is important that the positioning of the buttons 109, 111 on the hand grip side portion 104 is comfortable and ergonomic. Hence, it can be significance that the computer tablet can be turned to different oriented positions.

If the electric supply is broken to the holder 1, 101 the holder can still function the other way with the remaining energy supplied from the computer tablet 2, 102.

Accordingly, the buttons of the hand grip side 4 and the hand grip side portion 104 can operate functions in the computer tablets 2 and 102, respectively, and vice versa. If the low voltage-current to the holder 2, 102 is broken, the in-built battery is able to support the electronic circuits of the hand grip side 4 and the hand grip side portion 104. This can be desirable when the user will use the holder 1, 101 with mounted computer tablet 2, 102 separated from a normal operation position with voltage-current supply in order to wireless operate and test a machine function or any other issue which must be performed without voltage-current supply directly from the machine.

The holder 1, 101 does not necessarily consist of a frame, but can also consist of a frame of gripping arms holding the tablet computer 2, 102 firmly in a known way. This frame could comprise at least one socket on its long side or short side for connecting a handgrip portion which is either firmly or detachably attached thereto.

The holder 1 and 101 according to the invention for a tablet computer 2 and 102 or similar, respectively, can within the framework of the claims be modified as regards combinations of the design details that are described above.

The invention claimed is:

1. A holder for detachably holding a tablet computer comprising a screen for controlling electronic aids for agriculture machines and other mobile equipment and vehicles, said holder comprising:
 a frame, wherein said frame comprises a groove configured to receive said tablet computer;
 a hand grip side comprising buttons or sensors, wherein said buttons or sensors are configured to be activated in order to communicate with various functions of said tablet computer and/or of a machine which said tablet computer is arranged to control; and
 a socket for receiving a charging cable for the tablet computer and/or the holder, wherein when the charging cable is removed, only certain functions of the holder can be activated or certain functions of the tablet computer are blocked.

2. The holder according to claim 1, wherein at least one button of said buttons is a dead man's switch that is adapted to activate the tablet computer so that it can only be maneuvered through the holder.

3. The holder according to claim 1, wherein a graphical interface of the tablet computer comprises icons or areas that match the buttons and which are adapted to alter a character of the tablet computer, when at least one button of said buttons is activated.

4. The holder according to claim 1, wherein the buttons are located on an underside of the holder and an upper side of the holder, and
 wherein each of said buttons are activated in two steps, a first step of selecting a function by selecting one of the buttons on the underside of the holder, and a second step of maneuvering the function with the buttons on the upper side of the holder.

5. The holder according to claim 4, wherein one of the buttons on the underside of the holder is adapted to activate an icon on the screen of the tablet computer, which can be touched or pushed to control preselected functions of the machine,
 wherein one icon can be used and other icons remain inactive, and
 wherein the icons on the screen of the tablet computer can replace the buttons on the front side of the holder.

6. The holder according to claim 1, wherein said buttons have electronics built into the holder.

7. The holder according to claim 1, wherein said buttons are adapted to communicate wirelessly with the tablet computer.

8. The holder according to claim 1, wherein said holder and said tablet computer are provided on a vehicle, and
 wherein said holder and said tablet computer are arranged to control functions of said machine being an agricultural implement.

* * * * *